United States Patent
Huang et al.

(10) Patent No.: US 11,113,580 B2
(45) Date of Patent: Sep. 7, 2021

(54) IMAGE CLASSIFICATION SYSTEM AND METHOD

(71) Applicant: Industrial Technology Research Institute, Hsinchu (TW)

(72) Inventors: Jiung-Yao Huang, Taoyuan (TW); Hsin-Lung Wu, Taoyuan (TW); Juin-Ming Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/731,001

(22) Filed: Dec. 30, 2019

(65) Prior Publication Data
US 2021/0201088 A1    Jul. 1, 2021

(51) Int. Cl.
*G06K 9/00* (2006.01)
*G06K 9/62* (2006.01)
(Continued)

(52) U.S. Cl.
CPC .......... *G06K 9/6272* (2013.01); *G06K 9/623* (2013.01); *G06K 9/6211* (2013.01);
(Continued)

(58) Field of Classification Search
CPC .......... G06K 9/00718; G06K 9/00797; G06K 9/6407; G06K 9/2009; G06K 9/6423;
(Continued)

(56) References Cited

U.S. PATENT DOCUMENTS

| | | | | |
|---|---|---|---|---|
| 7,542,959 B2 * | 6/2009 | Barnhill | ................ | G06K 9/623 706/48 |
| 7,751,082 B2 * | 7/2010 | Otake | ................ | G06K 15/1852 358/1.9 |

(Continued)

FOREIGN PATENT DOCUMENTS

| | | |
|---|---|---|
| CN | 102385705 B | 9/2013 |
| CN | 104915388 A | 9/2015 |

(Continued)

OTHER PUBLICATIONS

Chouvatut et al., "Efficiency comparisons between k-centers and k-means algorithms", 2015, IEEE.*

(Continued)

*Primary Examiner* — Amir Alavi

(57) ABSTRACT

An image classification system includes a storage device, a computing device and a first processing device. The storage device stores a plurality of pseudo-centroid datasets, wherein the pseudo-centroid datasets correspond to a plurality of units of first image dataset, and the number of pseudo-centroid data points of each of the pseudo-centroid datasets is much smaller than the number of data points of each of the units of first image dataset. The computing device receives the second image data and computes a plurality of feature values of the second image data. The first processing device receives the feature values and the pseudo-centroid datasets, and compares the feature values with the pseudo-centroid data points to identify and classify the second image data.

16 Claims, 8 Drawing Sheets

- S602: Storing a plurality of pseudo-centroid datasets, wherein the pseudo-centroid datasets correspond to a plurality of units of first image dataset, and the number of pseudo-centroid data points of each of the pseudo-centroid datasets is much smaller than the number of data points of each of the units of first image dataset

- S604: Receiving second image data and computing a plurality of feature values of the second image data

- S606: Receiving the feature values and the pseudo-centroid datasets, and comparing the feature values with the pseudo-centroid data points to identify and classify the second image data

(51) Int. Cl.
*G06T 3/40* (2006.01)
*G06T 9/00* (2006.01)

(52) U.S. Cl.
CPC .............. *G06K 9/6218* (2013.01); *G06T 3/40* (2013.01); *G06T 9/00* (2013.01)

(58) Field of Classification Search
CPC ................ G06K 9/6272; G06K 9/6218; G06F 17/30257; G06F 17/3024; G06F 17/30249; H04N 1/40062; G06T 7/001
See application file for complete search history.

(56) References Cited

U.S. PATENT DOCUMENTS

| | | | |
|---|---|---|---|
| 8,385,662 B1* | 2/2013 | Yoon | G06K 9/6223 382/225 |
| 8,544,087 B1 | 9/2013 | Eskin et al. | |
| 8,873,813 B2* | 10/2014 | Tadayon | G06K 9/00288 382/118 |
| 8,996,436 B1* | 3/2015 | Ren | G06N 20/20 706/46 |
| 9,122,997 B1* | 9/2015 | Yang | G06N 20/20 |
| 9,147,129 B2* | 9/2015 | Liu | G06K 9/6256 |
| 9,224,071 B2 | 12/2015 | Tu et al. | |
| 9,916,538 B2* | 3/2018 | Zadeh | G06K 9/627 |
| 10,217,226 B2* | 2/2019 | Maranatha | G06K 9/6292 |
| 10,262,239 B2* | 4/2019 | Polak | G06K 9/4604 |
| 2006/0083428 A1* | 4/2006 | Ghosh | G06T 7/0012 382/224 |
| 2019/0087737 A1 | 3/2019 | Pendar et al. | |
| 2019/0164271 A1 | 5/2019 | Herchenbach et al. | |

FOREIGN PATENT DOCUMENTS

| | | |
|---|---|---|
| CN | 105243300 A | 1/2016 |
| CN | 108710761 A | 10/2018 |
| CN | 109492673 A | 3/2019 |
| TW | I385492 | 2/2013 |
| TW | 201732305 | 9/2017 |

OTHER PUBLICATIONS

Karami, Hossein et al., "A novel framework to generate clustering algorithms based on a particular classification structure," Artificial Intelligence and Signal Processing Conference (AISP), 2017, pp. 201-204, IEEE, US.

Xia, Gui-Song et al. "Accurate Annotation of Remote Sensing Images via Active Spectral Clustering with Little Expert Knowledge," Remote Sens., Nov. 2015, pp. 15014-15045, MDPI, US.

Wang, Gaihua et al. "An multi-scale learning network with depthwise separable convolutions," IPSJ Transactions on Computer Vision and Applications, 2018, pp. 1-8, vol. 10, No. 11, Open Access, US.

Cohen, Gregory et al. "EMNIST: an extension of MNIST to handwritten letters," arXiv:1702.05373, 2017, pp. 1-10, Australia.

Howard, Andrew G. et al. "MobileNets: Efficient convolutional neural networks for mobile vision applications," CoRR abs/1704.04861, 2017, pp. 1-9, Google Inc., US.

Owhadi-Kareshk, Moein et al., "Representation learning by Denoising Autoencoders for Clustering-based Classification," 5th International Conference on Computer and Knowledge Engineering (ICCKE), 2015, pp. 228-233, IEEE, US.

Mahmood, Arif et al., "Semi-supervised Spectral Clustering for Image Set Classification Clustering for Image Set Classification," IEEE Conference on Computer Vision and Pattern Recognition, 2014, pp. 121-128, IEEE, US.

Owhadi-Kareshk, Moein et al., "Spectral Clustering-based Classification," 5th International Conference on Computer and Knowledge Engineering (ICCKE), 2015, pp. 222-227, IEEE, US.

Hu, Fan et al. "Unsupervised Feature Learning Via Spectral Clustering of Multidimensional Patches for Remotely Sensed Scene Classification," IEEE Journal of Selected Topics in Applies Earth Observations and Remote Sensing, May 2015, pp. 2015-2030, vol. 8, No. 5, IEEE, US.

* cited by examiner

IMAGE CLASSIFICATION SYSTEM AND METHOD

TECHNICAL FIELD

The present disclosure relates to an image classification system and method.

BACKGROUND

With the maturing of deep learning technology and the progress of system on a chip (SoC), processing and classification performed on image data through an IoT edge device has become a trend.

However, the computing resources of the IoT edge device is often limited, wherein the computing resource includes computing capacity and memory size. Currently, the computing resource requirements for a model trained by a neural network are considerable. That is, the IoT edge device needs a large computing power of processing and classification performed on the image data, and needs a considerable memory space. Therefore, how to perform processing and classification of image data through the IoT edge device with limited computing resources has become a focus for technical improvements by various manufacturers.

SUMMARY

The present disclosure provides an image classification system, which includes a storage device, a computing device, and a first processing device. The storage device is configured to store a plurality of pseudo-centroid datasets, wherein the pseudo-centroid datasets correspond to a plurality of units of first image dataset, and the number of pseudo-centroid data points of each of the pseudo-centroid datasets is much smaller than the number of data points of each of the units of first image dataset. The computing device is configured to receive the second image data and compute a plurality of feature values of the second image data. The first processing device is configured to receive the feature values and the pseudo-centroid datasets, and compare the feature values with the pseudo-centroid data points to identify and classify the second image data.

In addition, the present disclosure provides an image classification method, which includes the following steps. A plurality of pseudo-centroid datasets are stored, wherein the pseudo-centroid datasets correspond to a plurality of units of first image dataset, and the number of pseudo-centroid data points of each of the pseudo-centroid datasets is much smaller than the number of data points of each of the units of first image dataset. Second image data is received and a plurality of feature values of the second image data are computed. The feature values and the pseudo-centroid datasets are received, and the feature values are compared with the pseudo-centroid data points to identify and classify the second image data.

BRIEF DESCRIPTION OF DRAWINGS

The present disclosure may be more fully understood by reading the subsequent detailed description and examples with references made to the accompanying drawings, wherein.

DETAILED DESCRIPTION OF DISCLOSED EMBODIMENTS

Technical terms of the disclosure are based on their general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or a similar element or component.

Figure 1:
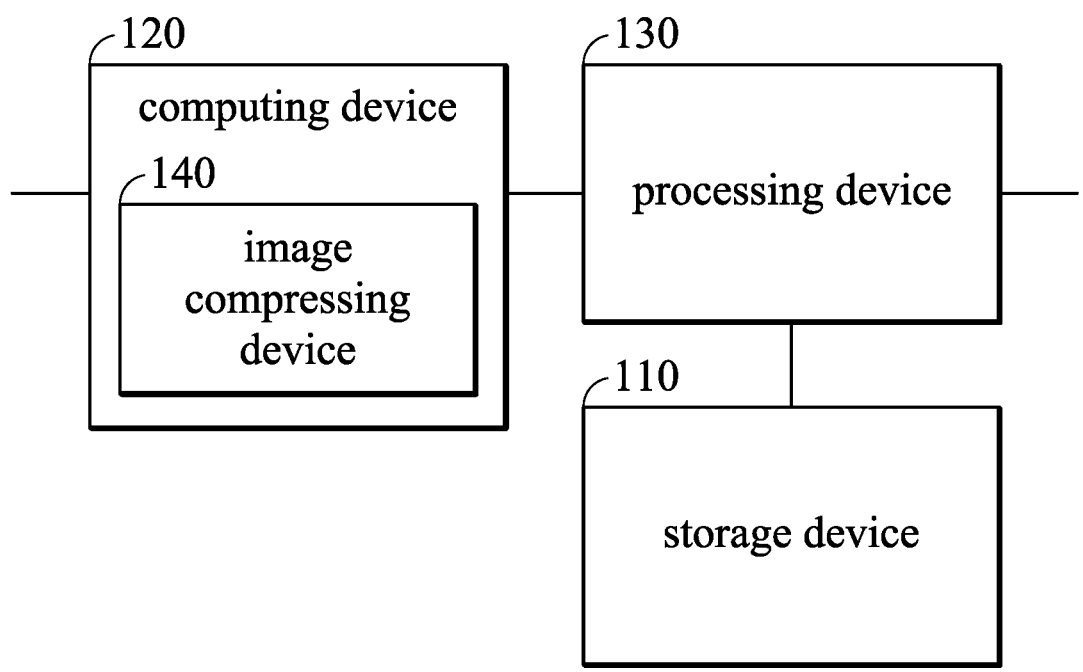
FIG. 1 is a schematic view of an image classification system according to an embodiment of the present disclosure.

FIG. 1 is a schematic view of an image classification system according to an embodiment of the present disclosure. Please refer to FIG. 1. The image classification system 100 includes a storage device 110, a computing device 120 and a processing device 130.

The storage device 110 is configured to store a plurality of pseudo-centroid datasets, wherein the pseudo-centroid datasets correspond to a plurality of units of first image dataset, and the number of pseudo-centroid data points of each of the pseudo-centroid datasets is much smaller than the number of data points of each of the units of first image dataset. In the embodiment, the storage device 110 is, for example, a memory, a hard disk, a solid-state disk, etc.

Figure 2:
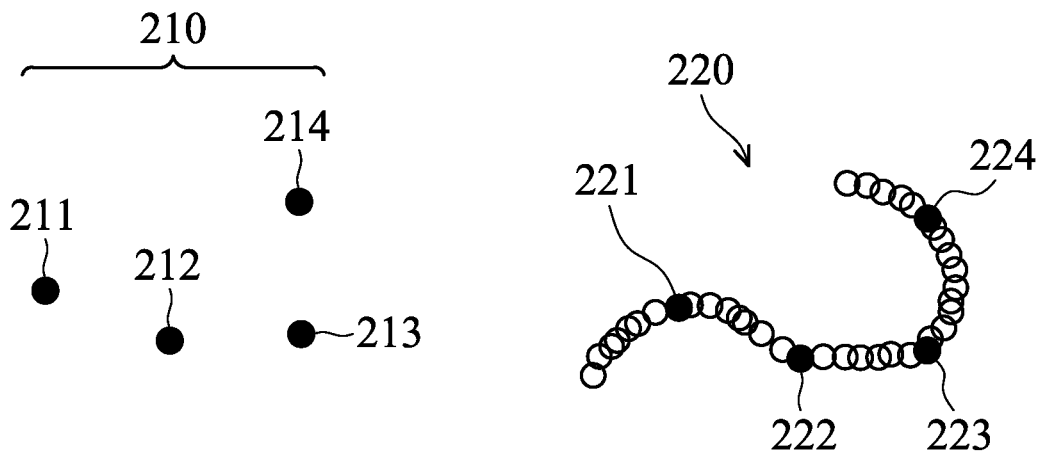
FIG. 2 is a schematic view of a corresponding relationship of a plurality of pseudo-centroid data points of a pseudo-centroid dataset and a plurality of data points of first image dataset according to an embodiment of the present disclosure.

In addition, a corresponding relationship of the pseudo-centroid datasets and the units of first image dataset may be as shown in FIG. 2. For convenience of explanation, FIG. 2 only shows a pseudo-centroid dataset 210 and first image dataset 220. In FIG. 2, the pseudo-centroid dataset 210 corresponds to for example, to the first image dataset 220. The pseudo-centroid dataset 210 includes, for example, a plurality of pseudo-centroid data points 211, 212, 213 and 214. The pseudo-centroid data points 211, 212, 213 and 214 are the same as data points 221, 222, 223 and 224 of the first image dataset 220. That is, the pseudo-centroid data points are selected from the data points of the first image dataset. Then, the selected data points (i.e., the data points 221, 222, 223 and 224) of the first image dataset are serves as the pseudo-centroid data points (i.e., pseudo-centroid data points 211, 212, 213 and 214). Afterward, the pseudo-centroid data points (i.e., pseudo-centroid data points 211, 212, 213 and 214) are clustered as the pseudo-centroid dataset (i.e., the pseudo-centroid dataset 210).

It can be seen from FIG. 2 that the number of pseudo-centroid data points 211, 212, 213 and 214 of the pseudo-centroid dataset 210 is much smaller than the number of data points of the first image dataset 220. Therefore, a storage space of the storage device 110 may be effectively decreased. In addition, the number of pseudo-centroid data points of the pseudo-centroid dataset and the number of data point of the first image dataset in FIG. 2 are one exemplary embodiment of the present disclosure, but the embodiment of the present disclosure is not limited thereto.

The computing device 120 is configured to receive second image data and compute a plurality of feature values of the second image data. In the embodiment, the computing device 120 computes the second image data, for example, through an image processing manner, so as to obtain the feature values corresponding to the second image data.

The processing device 130 is coupled to the storage device 110 and the computing device 120. The processing device 130 receives the feature values generated by the computing device 120 and the pseudo-centroid datasets (such as the pseudo-centroid dataset 210 as shown in FIG. 2) stored in the storage device 110. Then, the processing device 130 compares the above feature values with the pseudo-centroid data points to identify and classify the second image data. For example, the processing device 130 compares the similarity between the feature values and the pseudo-centroid data points 211, 212, 213 and 214 of the pseudo-centroid dataset 210 to determine whether the second image data matches the pseudo-centroid dataset 210.

When the similarity between the feature values of the second image data and the pseudo-centroid data points 211, 212, 213 and 214 of the pseudo-centroid dataset 210 is less than a predetermined value, the processing device 130 may determine that the second image data does not match the pseudo-centroid dataset 210. It indicates that the second image data does not belong to the category of the pseudo-centroid dataset 210.

When the similarity between the feature values of the second image data and the pseudo-centroid data points 211, 212, 213 and 214 of the pseudo-centroid dataset 210 is greater than or equal to the predetermined value, the processing device 130 may determine that the second image data matches the pseudo-centroid dataset 210. Then, the processing device 130 may classify the second image data into the pseudo-centroid dataset 210. The manner of comparing the other pseudo-centroid data sets with the feature values of the second image data may refer to the above embodiment of comparing the pseudo-centroid data sets with the feature values of the second image data, and the description thereof is not repeated herein.

As can be seen from the above description, when the image classification system 100 receives the second image data, the processing device 130 may compare the feature values of the second image data with the pseudo-centroid data points of the pseudo-centroid datasets without comparing the feature values of the second image data with the data points of the units of first image dataset, so as to identify and classify the second image data. Therefore, the computation amount of the processing device 130 may be effectively decreased, and the second image data belonging to which category of the corresponding pseudo-centroid data set may be quickly determined.

Figure 3:
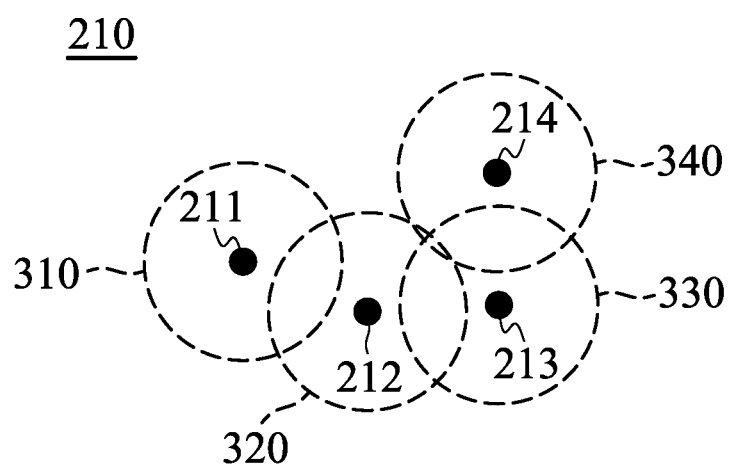
FIG. 3 is a schematic view of threshold ranges of the pseudo-centroid data points of the pseudo-centroid dataset according to an embodiment of the present disclosure.

Furthermore, when the processing device 130 receives the pseudo-centroid data points of the pseudo-centroid dataset, the processing device 130 further defines the threshold range of each of the pseudo-centroid data points. For example, the processing device 130 may define the threshold range of each of the pseudo-centroid data points through a Euclidean distance. As shown in FIG. 3, the reference number "310" is the threshold range of the pseudo-centroid data point 211 of the pseudo-centroid dataset 210, the reference number "320" is the threshold range of the pseudo-centroid data point 212 of the pseudo-centroid dataset 210, the reference number "330" is the threshold range of the pseudo-centroid data point 213 of the pseudo-centroid dataset 210, and the reference number "340" is the threshold range of the pseudo-centroid data point 214 of the pseudo-centroid dataset 210. The threshold range of each of the pseudo-centroid data points of the other pseudo-centroid datasets may refer to the description of the embodiment in FIG. 3, and the description thereof is not repeated herein.

Then, the processing device 130 may determine whether the feature values of the second image data fall into the threshold ranges (such as the threshold ranges 310, 320, 330 and 340 as shown in FIG. 3). When determining the feature values of the second image data fall into the threshold ranges, the processing device 130 computes the weights of the feature values of the second image data falling into the threshold ranges.

For example, when the feature value of the second image data approaches the pseudo-centroid data point 211 of the pseudo-centroid dataset 210, the weight of the feature value of the second image data computed by the processing device 130 falling into the threshold range 310 is higher. When the feature value of the second image data approach an edge of the threshold range 310 (i.e., the feature value of the second image data is far from the pseudo-centroid data point 211 of the pseudo-centroid dataset 210), the weight of the feature value of the second image data computed by the processing device 130 falling into the threshold range 310 is lower. The weights of the feature values of the second image data falling into the other threshold ranges may be deduced by analogy from the description of the above embodiment, and the description thereof is not repeated herein.

Then, after the processing device 130 computes the weights of the feature values of the second image data falling into the threshold ranges, the processing device 130 sums up the weights of each of the feature values of the second image data falling into the threshold ranges. For example, the processing device 130 may sum up the weights of the feature values of the second image data corresponding to the pseudo-centroid data points 211, 212, 213 and 214 of the pseudo-centroid dataset 210. Afterward, the processing device 130 may rank the weights corresponding to the pseudo-centroid datasets.

Then, the processing device 130 selects the pseudo-centroid dataset corresponding to the highest weight as a category of the second image data. Assume that the sum of the weights corresponding to the pseudo-centroid dataset 210 is the highest, the processing device 130 selects the pseudo-centroid dataset 210 as the category of the second image data. That is, the second image data is highly similar to the pseudo-centroid dataset 210, and the second image data may be classified into the category of the pseudo-centroid dataset 210.

When the feature values of the second image data do not fall into the threshold ranges of the pseudo-centroid data points of the pseudo-centroid datasets, the processing device 130 concludes that the second image data is outlier data. That is, the second image data does not belong to any category of the pseudo-centroid datasets.

Furthermore, the processing device 130 may perform a learning operation for the second image data through a reinforcement learning image compression algorithm to enhance the accuracy of identification and classification of the second image data.

For example, a dataset $D=\{s_1, s_2, \ldots, s_N\}$ is given. A d×d matrix $z_k^{(i,j)}$ is defined, wherein $z_k^{(i,j)}$ entries are all zero except for the (i,j)-entry. The value in (i,j)-entry is k and d can be any odd number.

$$w_0 = z_1^{(\frac{d+1}{2}, \frac{d+1}{2})}$$

is set, wherein $w_0$ indicates an initial filter of the feature computation of a convolution layer, and $z_1$ indicates an initial filtering matrix.

For t=1 to T, a classifier computing algorithm with $w_{t-1}$ is executed to output the pseudo-centroid datasets $PC_{SC}^{w_{t-1}}$ and the threshold ranges. A spectral clustering-based (SC-based) prediction and outlier data detection algorithm with $PC_{SC}^{w_{t-1}}$ is performed. Then, an image-size reduced dataset $D(w_{t-1})=\{s_1^{w_{t-1}}, s_2^{w_{t-1}}, \ldots, s_N^{w_{t-1}}\}$ is set and a labeled dataset is $LD(w_{t-1})=\{(s_1^{w_{t-1}}, y_1^{w_{t-1}}), (s_2^{w_{t-1}}, y_2^{w_{t-1}}), \ldots, (s_N^{w_{t-1}}, y_N^{w_{t-1}})\}$. Afterward, indicator function equations $$ACC(w_{t-1}) = \frac{1}{N}\sum_{i=1}^{N} IND[scPA^{w_{t-1}}(s_i) == y_i^{w_{t-1}}]$$

and $$ACC(w_{t-1} + z_\epsilon^{(i,j)}) = \frac{1}{N}\sum_{i=1}^{N} IND\left[scPA^{(w_{t-1}+z_\epsilon^{(i,j)})}(s_i) == y_i^{(w_{t-1}+z_\epsilon^{(i,j)})}\right]$$

are computed.

Then, a gradient $$(\tilde{\nabla})_{w_{i,j}}^c ACC(w_{t-1}) = \frac{1}{c}(ACC(w_{t-1} + z_\epsilon^{(i,j)}) - ACC(w_{t-1}))$$

is computed to generate a d×d matrix $\tilde{\nabla}_w^\epsilon ACC(w) = [\tilde{\nabla}_{w_{i,j}}^\epsilon ACC(w_{t-1})] \approx \nabla_w ACC(w_t)$, and $w_{t-1}$ is updated by $w_t \leftarrow w_{t-1} + \eta \tilde{\nabla}_{w_{i,j}}^\epsilon ACC(w_{t-1})$, wherein $\eta$ is a learning rate. Afterward, a filter $w_T$ is output. Therefore, the accuracy of identification and classification of the second image data may be effectively enhanced.

In addition, the computing device 120 includes an image compressing device 140. The image compressing device 140 may compress the second image data. In the embodiment, the image compressing device 140 may compress and filter the size of the second image data through a convolution operation and a max pooling operation to capture important data in the second image data. For example, the size of the second image data is compressed and filtered from 4*4 to 2*2, and the feature values of the second image data are still maintained. Therefore, the computation amount of the computing device 120 may be effectively decreased. Furthermore, in the embodiment, the image compressing device 140 is configured in the computing device 120, but the embodiment of the present disclosure is not limited thereto. The image compressing device 140 and the computing device 120 may be configured separately, and the same technical effect may also be achieved.

In the embodiment, the units of first image dataset are different from each other. In addition, the units of first image dataset and the second image data include, for example, a human face or a fingerprint, but the embodiment of the present disclosure is not limited thereto.

Figure 4:
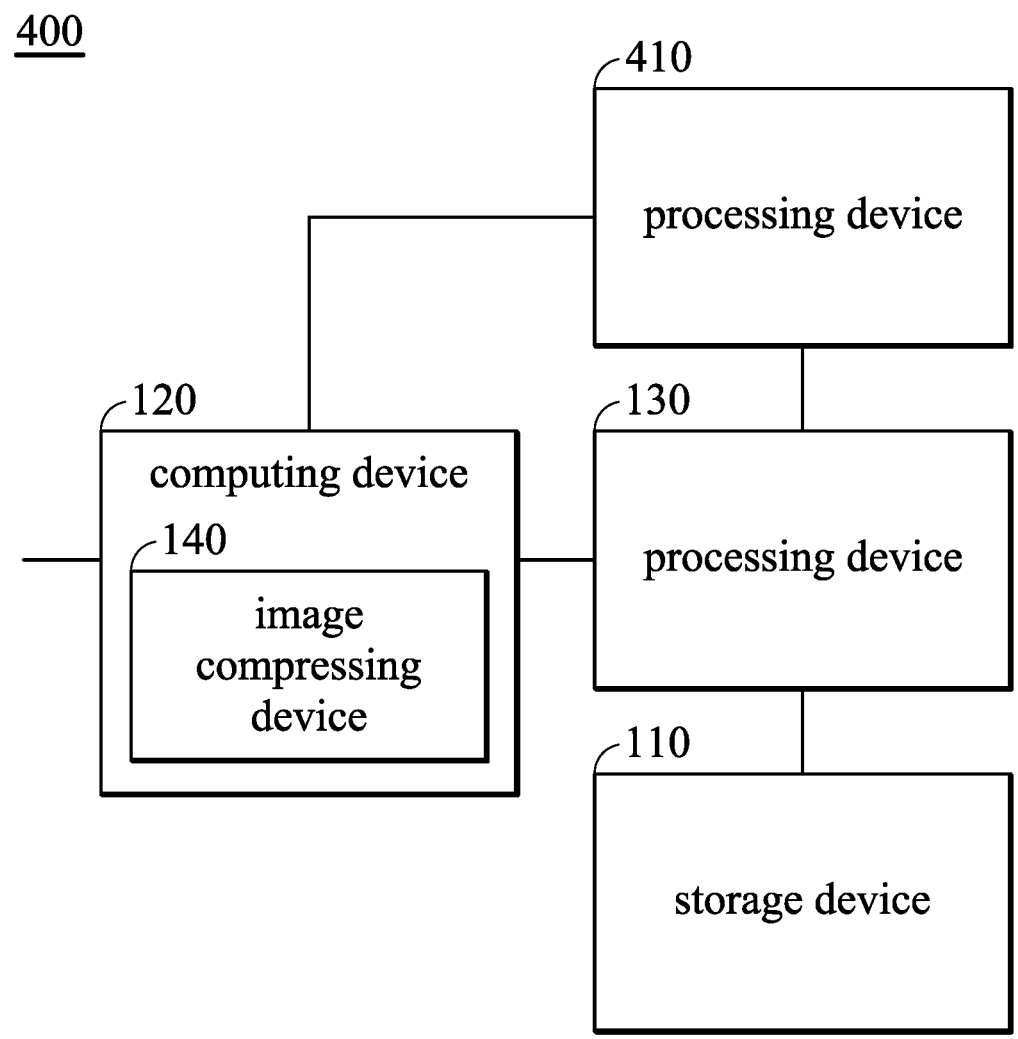
FIG. 4 is a schematic view of an image classification system according to another embodiment of the present disclosure.

FIG. 4 is a schematic view of an image classification system according to another embodiment of the present disclosure. Please refer to FIG. 4. The image classification system 400 includes a storage device 110, a computing device 120, a processing device 130, an image compressing device 140 and a processing device 410. In the embodiment, the storage device 110, the computing device 120, the processing device 130 and the image compressing device 140 in FIG. 4 are equal to or similar to the storage device 110, the computing device 120, the processing device 130 and image compressing device 140 in FIG. 1. Accordingly, the storage device 110, the computing device 120, the processing device 130 and the image compressing device 140 in FIG. 4 may refer to the description of the embodiment of FIG. 1, and the description thereof is not repeated herein.

The computing device 120 may receive the units of first image dataset and compute a plurality of feature values of the units of first image dataset. In the embodiment, the computing device 120 computes the units of first image dataset, for example, through the image processing manner, so as to obtain the feature values corresponding to the units of first image dataset.

The processing device 410 is coupled to the computing device 120 and the processing device 130. The processing device 410 receives the feature values of the units of first image dataset, computes a correlation of the feature values of the units of first image dataset, and clusters the data points of the units of first image dataset to generate a plurality of clusters.

Furthermore, the processing device 410 computes the correlation of the feature values of the units of first image dataset, and clusters the data points of the units of first image dataset to generate the plurality of clusters, for example, through a similarity matrix algorithm, a Laplacian matrix and a K-means clustering algorithm.

The processing device 410 computes the feature values of the units of first image dataset through the similarity matrix algorithm to generate a similarity matrix. For example, A dataset $D=\{s_1, s_2, \ldots, s_N\}$ in $R^{n \times n}$ is given. Then, a N×N matrix F is computed by setting $$F_{i,j} = \begin{cases} e^{\left(-\frac{\|s_i - s_j\|}{\alpha^2}\right)} & \text{if } i \neq j, \\ 0 & \text{if } i = j \end{cases}$$

wherein $\alpha$ is a constant and is derived from the experiments.

For each i, $rank_t(i) = \{j_1, j_2, \ldots j_t\}$ is defined, wherein $F_{ij_1}, F_{ij_2}, \ldots, F_{ij_t}$ are t largest values in the set $\{F_{ij}: 1 \leq j \leq N\}$. Then, a N×N matrix A is computed, such that, for each $1 \leq i \leq N$, $A_{ij}=F_{ij}$ if $j \in rank_t(i)$ and $A_{ij}=0$ otherwise. The similarity matrix W may be computed by $W_{ij}=\max\{A_{ij}, A_{ji}\}$ for any $1 \leq i,j \leq N$.

The processing device 410 computes the similarity matrix through the Laplacian matrix algorithm to generate a row-normalized Laplacian matrix. For example, a N×N diagonal matrix is computed by setting $G_{ii}=\Sigma_{j:1\leq j\leq N}W_{ij}$. The Laplacian matrix L is defined by $L=G^{-1/2}WG^{-1/2}$. u largest eigenvalues of the Laplacian matrix L and the their corresponding eigenvectors $v_1, v_2, \ldots, v_u$ are computed. An N×u matrix R is defined, such that i-th column vector is exactly $v_i$ for $1\leq i\leq u$. An N×u row-normalized Laplacian matrix Q is defined, such that j-th row vector of the N×u row-normalized Laplacian matrix Q is the unit vector of j-th row vector of the N×u matrix R, wherein $1\leq j\leq N$.

The processing device 410 computes the row-normalized Laplacian matrix Q through the K-means clustering algorithm to cluster the data points of the units of first image dataset, so as to generate low dimensional clusters. For example, a u-dimensional dataset $D_{SC}=\{q_1, q_2, \ldots, q_N\}$ is generated, wherein $q_i$ is i-th row vector of the N×u row-normalized Laplacian matrix Q. A function $f: D \to D_{SC}$ is defined by $f(s_i)=q_i$, wherein $s_i$ is i-th data point in D and $q_i$ is its corresponding data point in the u-dimensional space. The K-means clustering algorithm is performed for the u-dimensional dataset to generate u pairs of clusters and centroids: $\{(C_1, c_1), (C_2, c_2), \ldots, (C_u, c_u)\}$, wherein $c_k$ is the centroid of the cluster.

Figure 5:
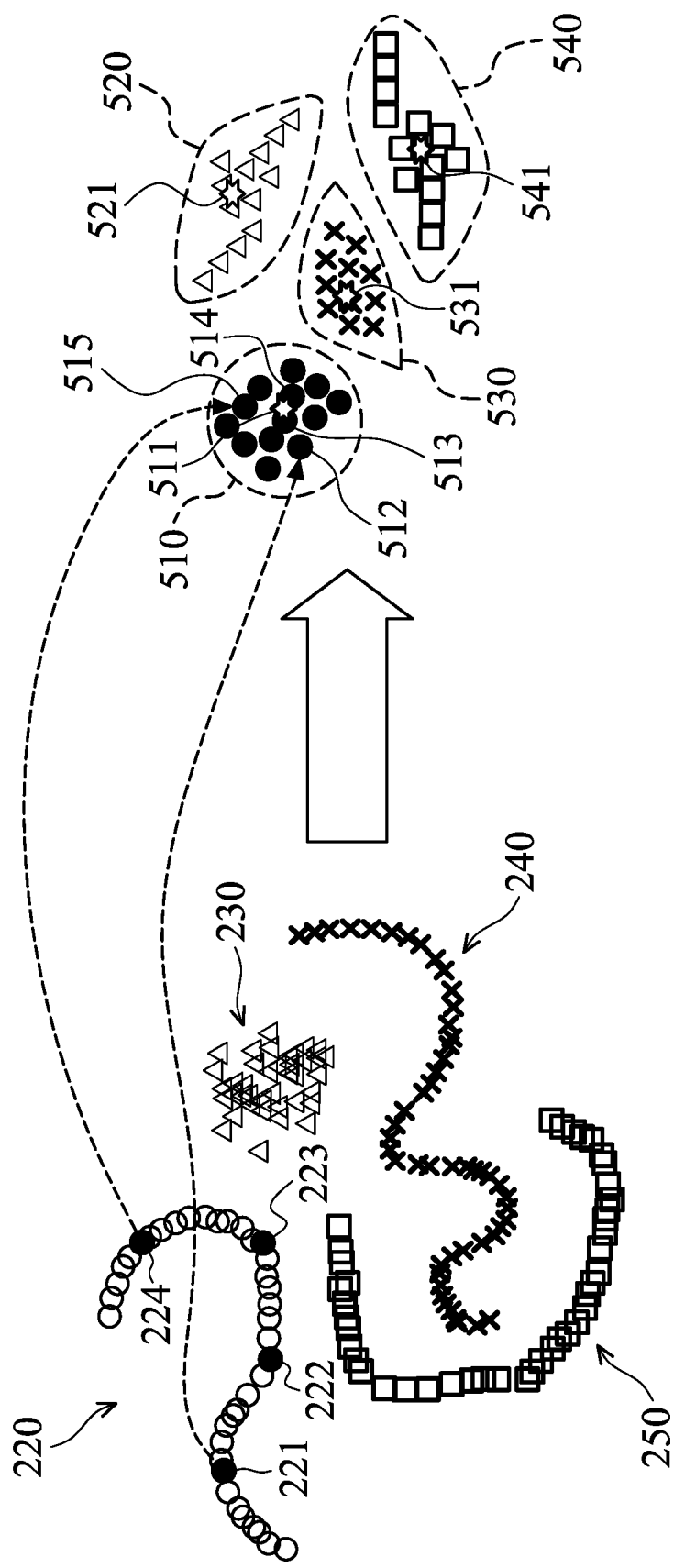
FIG. 5 is a schematic view of a corresponding relationship of a plurality of data points of a plurality of units of first image dataset and a plurality of data points of a plurality of clusters according to another embodiment of the present disclosure.

In the embodiment, a corresponding relationship of the data points of the units of first image dataset and the data points of the clusters may be as shown in FIG. 5. Please refer to FIG. 5. The units of first image dataset 220, 230, 240 and 250 are non-convex data. The processing device 410 transforms the units of first image dataset 220, 230, 240 and 250 into convex data through a transformation function, computes the convex data through the K-means clustering algorithm to generate clusters 510, 520, 530 and 540 corresponding to the units of first image dataset 220, 230, 240 and 250.

In addition, the cluster 510 corresponds to the first image dataset 220. The cluster 520 corresponds to the first image dataset 230. The cluster 530 corresponds to the first image dataset 240. The cluster 540 corresponds to the first image dataset 250. Furthermore, the data point 221 of the first image dataset 220 corresponds to, for example, the data point of 512 the cluster 510. The data point 222 of the first image dataset 220 corresponds to, for example, the data point 513 of the cluster 510. The data point 223 of the first image dataset 220 corresponds to, for example, the data point 514 of the cluster 510. The data point 224 of the first image dataset 220 corresponds to, for example, the data point 515 of the cluster 510. The corresponding relationships of the data points of other units of first image dataset and the data points of other clusters may refer to the above description, and the description thereof is not repeated herein.

Then, the processing device 130 receives the clusters 510, 520, 530 and 540, and computes centroid points 511, 521, 531 and 541 of each of the clusters 510, 520, 530 and 540. Afterward, the processing device 130 may define threshold ranges of the centroid points 511, 521, 531 and 541. In the embodiment, the processing device 130 may define the threshold range (not shown) of each of the centroid points 511, 521, 531 and 541 through the Euclidean distance.

Then, the processing device 130 selects the data points in each of the clusters 510, 520, 530 and 540 falling into the threshold ranges of the centroid points 511, 521, 531 and 541 as the pseudo-centroid data points according to the threshold ranges of the centroid points 511, 521, 531 and 541. For example, the data points 512, 513, 514 and 515 of the cluster 510 fall into the threshold range of the centroid point 511, the processing device 130 may serve the data corresponding to the data points 512, 513, 514 and 515 (i.e., corresponding to the data of the pseudo-centroid data points 221, 222, 223 and 224 in the left side of FIG. 5) in the cluster 510 as the data of pseudo-centroid data points of the centroid point 511.

Afterward, the processing device 130 may store information of the pseudo-centroid dataset and the pseudo-centroid data points thereof in the storage device 110, so as to perform the identification and classification operation for the second image data.

In addition, the image compressing device 140 may also compress the units of first image dataset. In the embodiment, the image compressing device 140 may compress and filter the sizes of the units of first image dataset through the convolution operation and the max pooling operation to capture important data in the units of first image dataset. For example, the sizes of the units of first image dataset is compressed and filtered from 4*4 to 2*2, and the feature values of the units of first image dataset are still maintained. Therefore, the computation amount of the computing device 120 may be effectively decreased, and the storage space of the storage device 110 may be decreased.

In addition, when the processing device 130 determines that the second image data is the outlier data, the processing device 130 may record this second image data in the storage device 110. Then, when the number of the second image data being the outlier data reaches a predetermined value, the processing device 130 may output the second image data corresponding to the outlier data to the computing device 120 and the processing device 410 for processing, so as to generate new clusters. Afterward, the processing device 130 generates new pseudo-centroid datasets and new pseudo-centroid data points according to the new clusters to update the pseudo-centroid datasets and the pseudo-centroid data points stored in the storage device 110. Therefore, the pseudo-centroid datasets and the pseudo-centroid data points may be updated, so that the speed and accuracy of identification and classification of the second image data are increased, and the convenience of use is increased.

Figure 6:
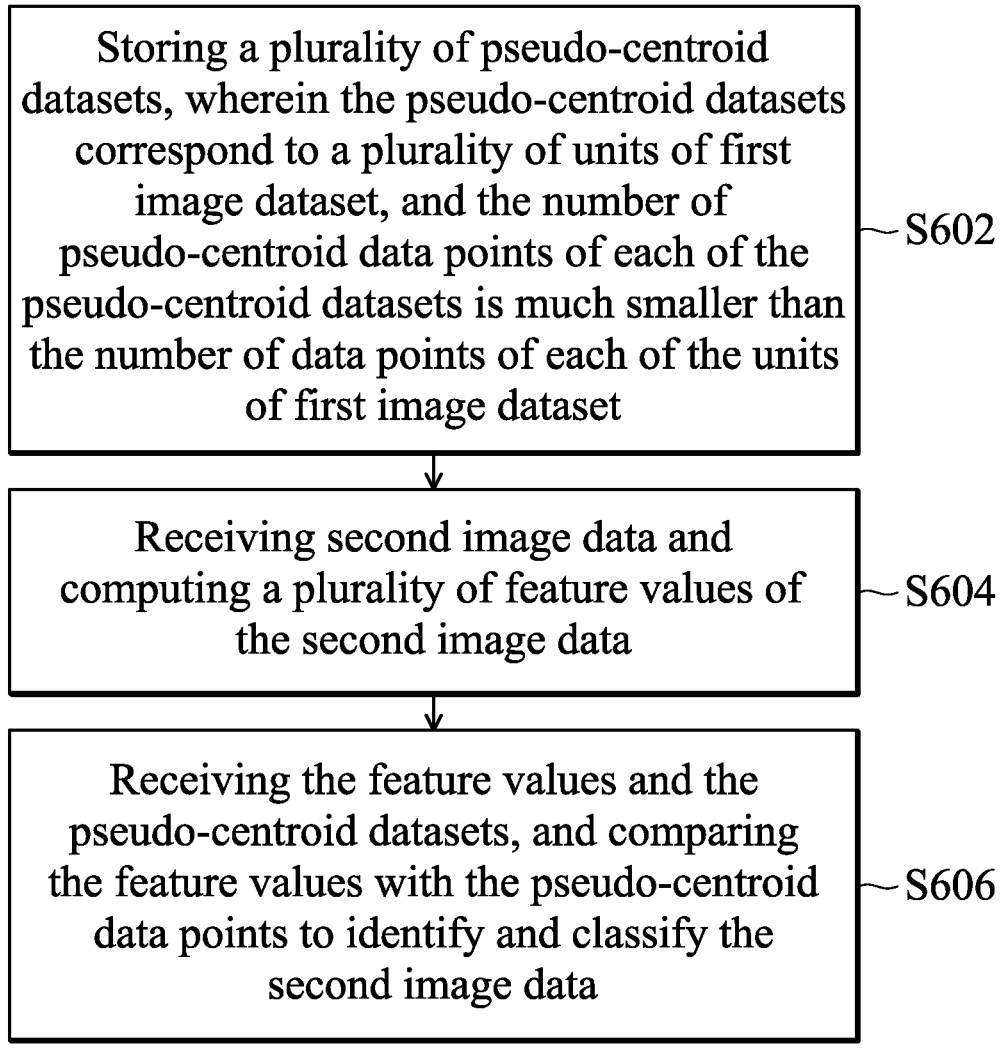
FIG. 6 is a flowchart of an image classification method according to an embodiment of the present disclosure.

FIG. 6 is a flowchart of an image classification method according to an embodiment of the present disclosure. In step S602, the method involves storing a plurality of pseudo-centroid datasets, wherein the pseudo-centroid datasets correspond to a plurality of units of first image dataset, and the number of pseudo-centroid data points of each of the pseudo-centroid datasets is much smaller than the number of data points of each of the units of first image dataset. In step S604, the method involves receiving second image data and computing a plurality of feature values of the second image data. In step S606, the method involves receiving the feature values and the pseudo-centroid datasets, and comparing the feature values with the pseudo-centroid data points to identify and classify the second image data. In the embodiment, the units of first image dataset are different from each other. The units of first image dataset and the second image data include a human face or a fingerprint.

Figure 7:
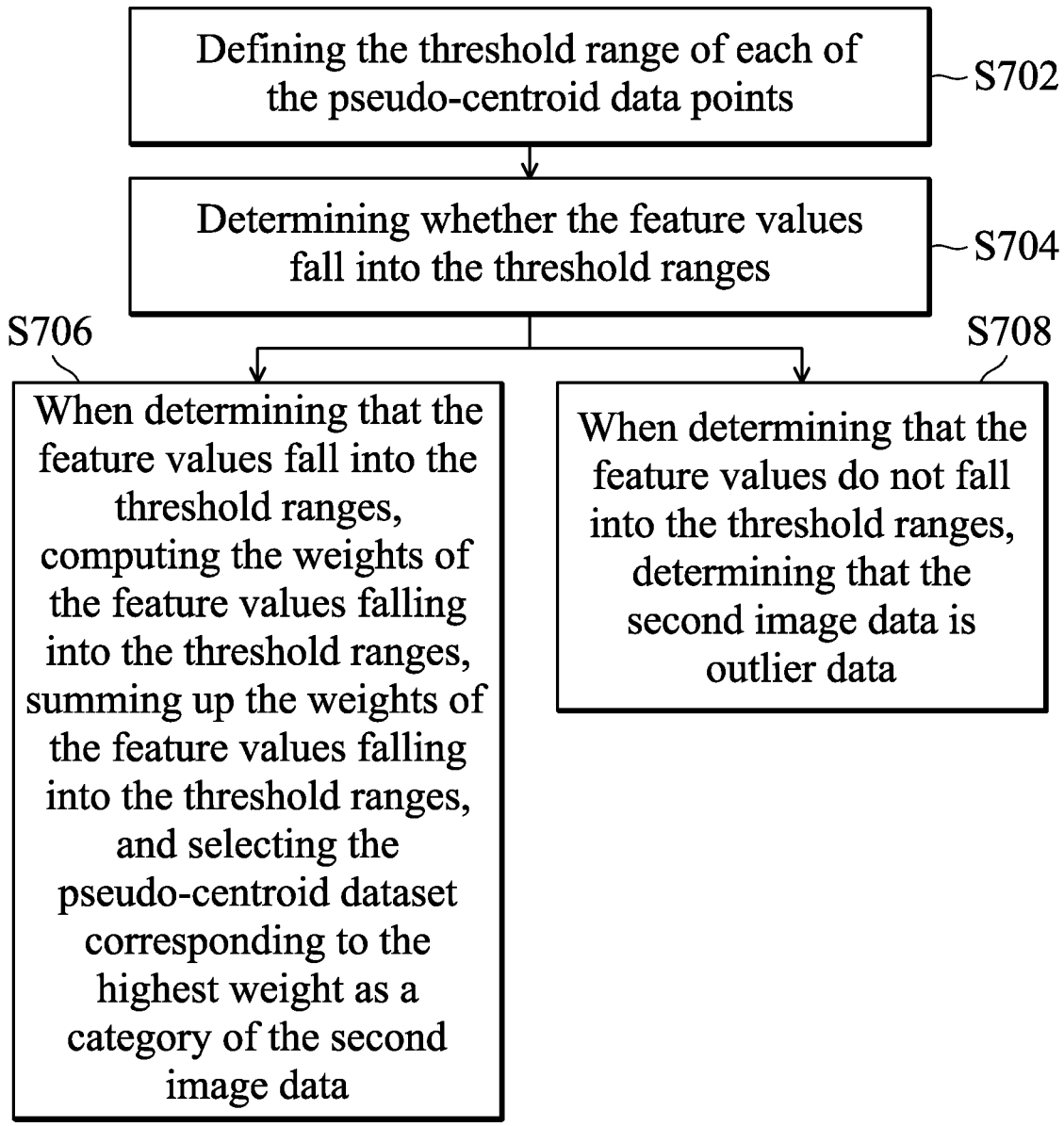
FIG. 7 is a detailed flowchart of step S606 in FIG. 6.

FIG. 7 is a detailed flowchart of step S606 in FIG. 6. In step S702, the method involves defining the threshold range of each of the pseudo-centroid data points. In step S704, the method involves determining whether the feature values fall into the threshold ranges. In step S706, the method involves when determining that the feature values fall into the threshold ranges, computing the weights of the feature values falling into the threshold ranges, summing up the weights of the feature values falling into the threshold ranges, and selecting the pseudo-centroid dataset corresponding to the highest weight as a category of the second image data. In step S708, the method involves when determining that the feature values do not fall into the threshold ranges, determining that the second image data is outlier data.

Figure 8:
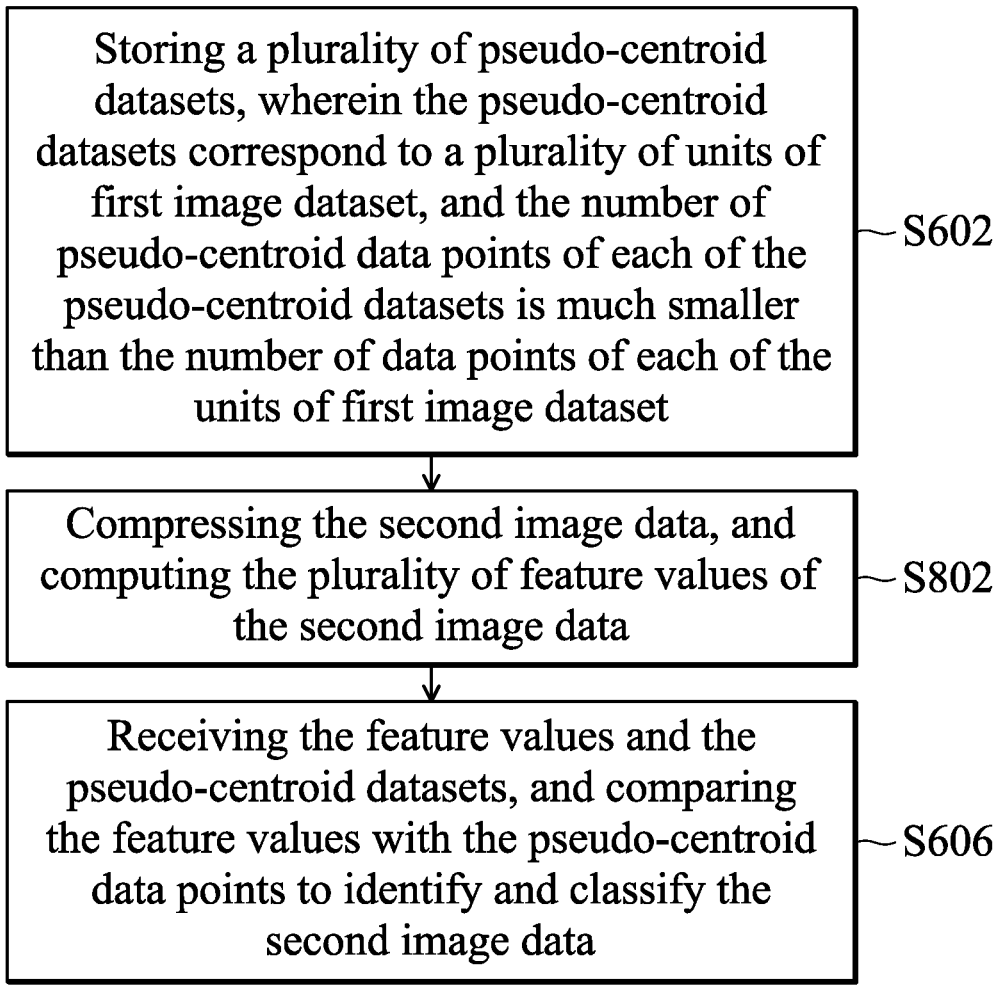
FIG. 8 is a flowchart of an image classification method according to another embodiment of the present disclosure.

FIG. 8 is a flowchart of an image classification method according to another embodiment of the present disclosure. In the embodiment, steps S602 and S606 in FIG. 8 are equal to or similar to steps S602 and S606 in FIG. 6. Accordingly, steps S602 and S606 in FIG. 8 may refer to the description of the embodiment in FIG. 6, and the description thereof is not repeated herein. In step S802, the method involves compressing the second image data, and computing the plurality of feature values of the second image data.

Figure 9:
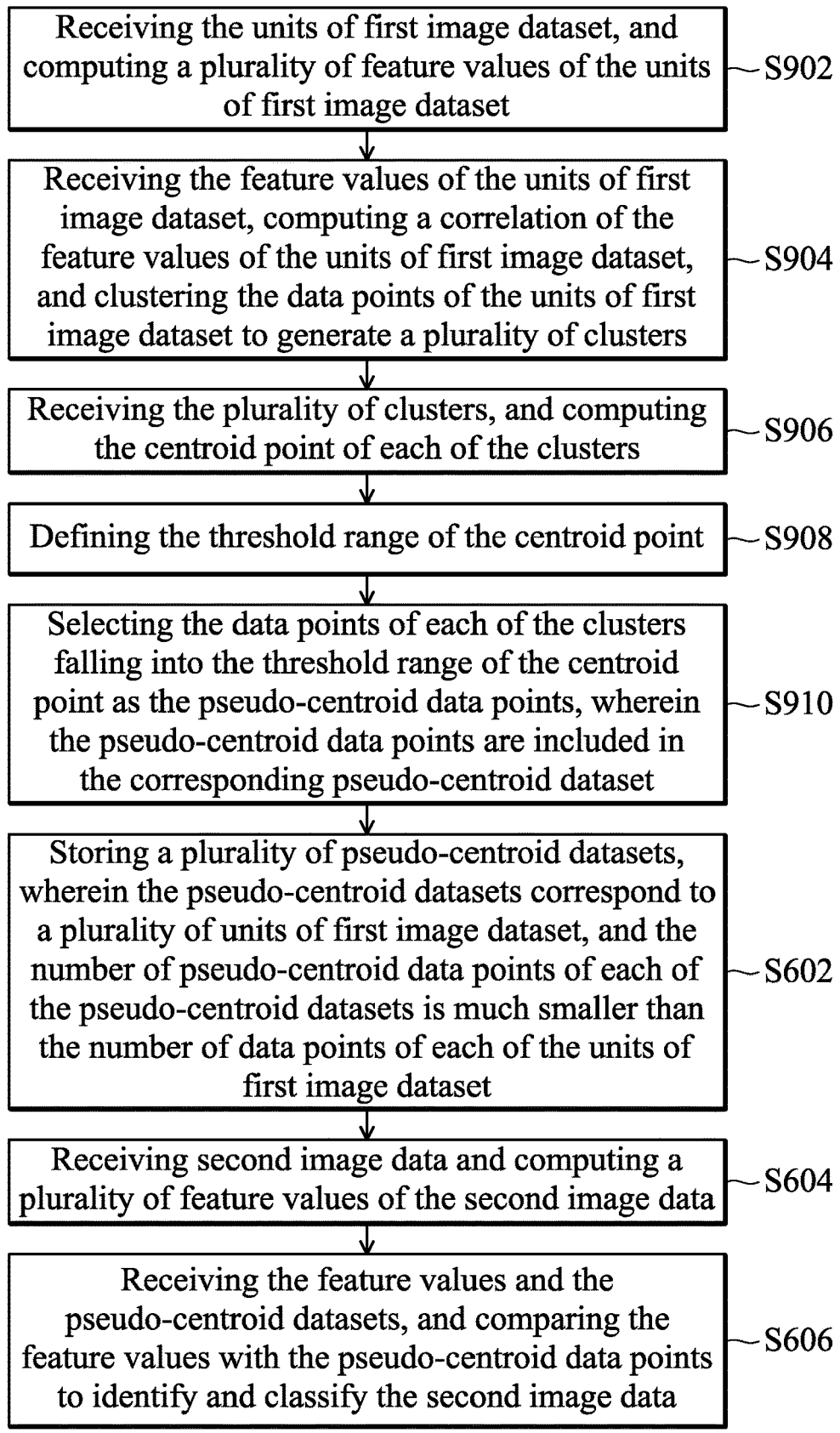
FIG. 9 is a flowchart of an image classification method according to another embodiment of the present disclosure.

FIG. 9 is a flowchart of an image classification method according to another embodiment of the present disclosure. In the embodiment, steps S602-S606 in FIG. 9 are equal to or similar to steps S602-S606 in FIG. 6. Accordingly, steps S602-S606 in FIG. 9 may refer to the description of the embodiment in FIG. 6, and the description thereof is not repeated herein.

In step S902, the method involves receiving the units of first image dataset, and computing a plurality of feature values of the units of first image dataset. In step S904, the method involves receiving the feature values of the units of first image dataset, computing a correlation of the feature values of the units of first image dataset, and clustering the data points of the units of first image dataset to generate a plurality of clusters. In step S906, the method involves receiving the plurality of clusters, and computing the centroid point of each of the clusters. In step S908, the method involves defining the threshold range of the centroid point. In step S910, the method involves selecting the data points of each of the clusters falling into the threshold range of the centroid point as the pseudo-centroid data points, wherein the pseudo-centroid data points are included in the corresponding pseudo-centroid dataset.

In summary, according to the image classification system and method disclosed by the present disclosure, the pseudo-centroid datasets are stored, wherein the pseudo-centroid datasets correspond to the plurality of units of first image dataset, and the number of pseudo-centroid data points of each of the pseudo-centroid datasets is much smaller than the number of data points of each of the units of first image dataset. Then, the feature values of the second image data are computed, and the feature values of the second image data are compared with the pseudo-centroid data points of the pseudo-centroid datasets to identify and classify the second image data. Therefore, the computation amount of identification and classification of the image data may be effectively decreased, the speed and accuracy of identification and classification of the images are increased, and the convenience of use is increased.

In addition, the embodiment of the present disclosure further compresses the image data, thereby decreasing the computation amount of the data computing and the storage space. Furthermore, the embodiment of the present disclosure also uses the reinforcement learning image compression algorithm to identify and classify the second image data, thereby enhancing the accuracy of identification and classification of the second image data.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An image classification system, comprising:
   a non-transitory storage device, configured to store a plurality of pseudo-centroid datasets, wherein the pseudo-centroid datasets correspond to a plurality of units of first image dataset, and the number of pseudo-centroid data points of each of the pseudo-centroid datasets is much smaller than the number of data points of each of the units of first image dataset;
   a computing device, configured to receive second image data and compute a plurality of feature values of the second image data; and
   a first processing device, configured to receive the feature values and the pseudo-centroid datasets, and compare the feature values with the pseudo-centroid data points to identify and classify the second image data.

2. The image classification system as claimed in claim 1, wherein the first processing device further defines a threshold range of each of the pseudo-centroid data points, the processing device determines whether the feature values fall into the threshold ranges, when the feature values fall into the threshold ranges, the first processing device computes weights of the feature values falling into the threshold ranges, sums up the weights of the feature values falling into the threshold ranges, and selects the pseudo-centroid dataset corresponding to a highest weight as a category of the second image data, and when determining that the feature values do not fall into the threshold ranges, the first processing device determines that the second image data is outlier data.

3. The image classification system as claimed in claim 1, wherein the computing device comprises:
   an image compressing device, configured to compress the second image data.

4. The image classification system as claimed in claim 3, wherein the image compressing device compresses the second image data through a convolution operation and a max pooling operation.

5. The image classification system as claimed in claim 1, wherein the computing device further computes a plurality of feature values of the units of first image dataset, and the image classification system further comprises:
   a second processing device, configured to receive the feature values of the units of first image dataset, compute a correlation of the feature values of the units of first image dataset, and cluster the data points of the units of first image dataset to generate a plurality of clusters;
   wherein the first processing device receives the plurality of clusters, computes a centroid point of each of the clusters, defines a threshold range of the centroid point, and selects the data points of each of the clusters falling into the threshold range of the centroid point as the pseudo-centroid data points, wherein the pseudo-centroid data points are comprised in the corresponding pseudo-centroid dataset.

6. The image classification system as claimed in claim 5, wherein the second processing device computes the correlation of the feature values of the units of first image dataset, and clusters the data points of the units of first image dataset to generate the plurality of clusters through a similarity matrix algorithm, a Laplacian matrix algorithm, and a K-means clustering algorithm.

7. The image classification system as claimed in claim 1, wherein the units of first image dataset are different from each other.

8. The image classification system as claimed in claim 1, wherein the units of first image dataset and the second image data comprise a human face or a fingerprint.

9. An image classification method, comprising:
    storing a plurality of pseudo-centroid datasets, wherein the pseudo-centroid datasets correspond to a plurality of units of first image dataset, and the number of pseudo-centroid data points of each of the pseudo-centroid datasets is much smaller than the number of data points of each of the units of first image dataset;
    receiving second image data and computing a plurality of feature values of the second image data; and
    receiving the feature values and the pseudo-centroid datasets, and comparing the feature values with the pseudo-centroid data points to identify and classify the second image data.

10. The image classification method as claimed in claim 9, wherein the step of receiving the feature values and the pseudo-centroid datasets and comparing the feature values with the pseudo-centroid data points to identify and classify the second image data comprises:
    defining a threshold range of each of the pseudo-centroid data points;
    determining whether the feature values fall into the threshold ranges;
    when determining that the feature values fall into the threshold ranges, computing weights of the feature values falling into the threshold ranges, summing up the weights of the feature values falling into the threshold ranges, and selecting the pseudo-centroid dataset corresponding to a highest weight as a category of the second image data; and
    when determining that the feature values do not fall into the threshold ranges, determining that the second image data is outlier data.

11. The image classification method as claimed in claim 9, wherein the step of receiving the second image data and computing the plurality of feature values of the second image data comprises:
    compressing the second image data, and computing the plurality of feature values of the second image data.

12. The image classification method as claimed in claim 11, wherein the second image data is compressed through a convolution operation and a max pooling operation.

13. The image classification method as claimed in claim 9, further comprising:
    receiving the units of first image dataset, and computing a plurality of feature values of the units of first image dataset;
    receiving the feature values of the units of first image dataset, computing a correlation of the feature values of the units of first image dataset, and clustering the data points of the units of first image dataset to generate a plurality of clusters;
    receiving the plurality of clusters, and computing a centroid point of each of the clusters;
    defining a threshold range for the centroid point; and
    selecting the data points of each of the clusters falling into the threshold range of the centroid point as the pseudo-centroid data points, wherein the pseudo-centroid data points are comprised in the corresponding pseudo-centroid dataset.

14. The image classification method as claimed in claim 13, wherein the method includes computing the correlation of the feature values of the units of first image dataset, and clustering the data points of the units of first image dataset to generate the plurality of clusters through a similarity matrix algorithm, a Laplacian matrix algorithm, and a K-means clustering algorithm.

15. The image classification method as claimed in claim 9, wherein the units of first image dataset are different from each other.

16. The image classification method as claimed in claim 9, wherein the units of first image dataset and the second image data comprise a human face or a fingerprint.

* * * * *